(12) United States Patent
Suarez et al.

(10) Patent No.: US 10,545,930 B2
(45) Date of Patent: Jan. 28, 2020

(54) LABELING ENTITIES IN A CANONICAL DATA MODEL

(71) Applicant: SAP SE, Walldorf (DE)

(72) Inventors: Nathali Ortiz Suarez, Walldorf (DE);
Jens Lemcke, Karlsruhe (DE);
Gunther Stuhec, Walldorf (DE)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 15/710,699

(22) Filed: Sep. 20, 2017

(65) Prior Publication Data

US 2018/0011879 A1 Jan. 11, 2018

Related U.S. Application Data

(63) Continuation of application No. 14/576,098, filed on Dec. 18, 2014, now Pat. No. 9,785,658.

(60) Provisional application No. 62/061,056, filed on Oct. 7, 2014.

(51) Int. Cl.
*G06F 16/21* (2019.01)

(52) U.S. Cl.
CPC .................................. *G06F 16/213* (2019.01)

(58) Field of Classification Search
CPC .......................... G06Q 10/0637; G06F 16/213
See application file for complete search history.

(56) References Cited

U.S. PATENT DOCUMENTS

| 8,676,866 B2 | 3/2014 | Lemcke et al. |
| 8,862,458 B2 | 10/2014 | Freising et al. |
| 2003/0069877 A1 | 4/2003 | Grefenstette et al. |
| 2003/0177111 A1 | 9/2003 | Egendorf et al. |
| 2006/0253476 A1 | 11/2006 | Roth et al. |
| 2009/0282012 A1 | 11/2009 | Konig et al. |
| 2011/0229035 A1 | 9/2011 | Sohma et al. |
| 2012/0143831 A1* | 6/2012 | Amulu ............... G06Q 10/0637 707/687 |
| 2016/0098429 A1 | 4/2016 | Suarez et al. |

OTHER PUBLICATIONS

"U.S. Appl. No. 14/576,098, Non Final Office Action dated Mar. 15, 2017", 17 pgs.
"U.S. Appl. No. 14/576,098, Notice of Allowance dated Jul. 21, 2017", 7 pgs.
"U.S. Appl. No. 14/576,098, Response filed Jun. 1, 2017 to Non Final Office Action dated Mar. 15, 2017", 14 pgs.

(Continued)

*Primary Examiner* — Etienne P Leroux
(74) *Attorney, Agent, or Firm* — Schwegman Lundberg & Woessner, P.A.

(57) ABSTRACT

Enterprises express the concepts of their electronic business-to-business (B2B) communication in differently structured ontology-like schemas. Collaborations benefit from merging the common concepts into semantically unique Business Entities (BEs) in a merged schema. Methods and systems for labeling the merged schema with descriptive, yet short and unique names, are described. A heuristically ranked list of descriptive candidate phrases for each BE is derived locally from the names and descriptions of the underlying concepts. A semantically unique candidate phrase is assigned to each BE that discriminates it from the other BEs by employing a constraint satisfaction problem solver.

20 Claims, 7 Drawing Sheets

(56) References Cited

OTHER PUBLICATIONS

Dietrich, Michael, et al., "Mulitlingual Extraction and Mapping of Dictionary Entry Names in Business Schema Integration", Proceedings of iiWAS, (2010), 1-4.

Green, Rebecca, et al., "Inducing a Semantic Frame Lexicon from WordNet Data", Proceedings of the 2nd Workshop on Text Meaning and Interpretation, (2004), 65-72.

Kim, Su Nam, et al., "SemEval—2010 Task 5: Automatic Keyphrase Extraction from Scientific Articles", Proceedings of the 5th International Workshop on Sematic Evaluation, ACL, (2010), 21-26.

Roth, Dan, et al., "A Linear Programming Formulation for Global Inference in Natural Language Tasks", CoNLL '04, (Jun. 9, 2004), 1-8.

* cited by examiner

610
```
ENTERPRISE A DATA VIEW

ORDER
   CONTRACT
      DATE TIME: NOVEMBER 10, 2014
      DATE TIME QUALIFIER: STANDARD
```

620
```
CANONICAL DATA MODEL DATA VIEW

ORDER
   CONTRACT
      DATE/TIME: NOVEMBER 10, 2014
      DATE CODE QUALIFIER: STANDARD
```

630
```
ENTERPRISE B DATA VIEW

PURCHASE ORDER
   DATE/TIME/PERIOD: NOVEMBER 10, 2014
   DATE OR TIME OR PERIOD FUNCTION CODE QUALIFIER: STANDARD
```

LABELING ENTITIES IN A CANONICAL DATA MODEL

PRIORITY CLAIM

This application is a continuation of U.S. patent application Ser. No. 14/576,098, filed Dec. 18, 2014, entitled "Labelling Business Entities in a Canonical Data Model," which in turn claims priority to U.S. Provisional Patent Application No. 62/061,056, filed Oct. 7, 2014, entitled "Labelling Business Entities in a Canonical Data Model." Each of these applications is incorporated herein by reference in its entirety.

BACKGROUND

With markets becoming global, commercial organizations increasingly work in collaborative projects. One obstacle to the efficient exchange of information between partners are heterogeneous information systems. Businesses often exchange electronic messages (sometimes termed "B2B" or business-to-business messages) such as Purchase Orders. The messages from each business contain compatible concepts (e.g., shipment dates and delivery address), but the concepts are arranged and named differently in the ontology-like messaging standards (schemas) that each company implements. The schema used by each business may be proprietary or follow a third-party-defined standard. For instance, two exemplary schemas may speak about a delivery date, but use different phrases such as "Current Scheduled Delivery" and "Delivery Date/Time, estimated." The result of a misinterpretation is likely. Consequently, inconsistent or misleading information is received, which may lead to a faulty product in manufacturing or cause other financial losses.

BRIEF DESCRIPTION OF THE DRAWINGS

Some embodiments are illustrated by way of example and not limitation in the figures of the accompanying drawings.

DETAILED DESCRIPTION

Example methods and systems are directed to consistently labeling business entities residing, for example, in a canonical data model. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some embodiments, the present invention aligns participating enterprises' schemas and finds new, unique and appropriate (natural-language) names for the contained concepts, for all participants to use. A schema is comprised of a set of business entities and their relationships. A business entity (BE) is a data field or a container for other business entities. A data field contains a value of a single type, such as an integer, floating-point value, date, or text. A container of business entities has relationships with the contained business entities.

In different embodiments, different criteria for selecting labels may be used. In one example embodiment, labels are selected that are natural language words or phrases that are descriptive, discriminative, short, and semantically unique.

A descriptive label clarifies the concept of its BE. The concepts which are most frequently present in the names and descriptions of a BE used to refer to that BE, for example by the schemas created by the different enterprises, are candidates for labels for that BE in the merged schema. A discriminative label states the distinguishing property of its BE. Candidates for labeling a BE are the concepts which are most frequently present in its names and descriptions, but not in the overall input schemas. A short label uses fewer words than a long label. A semantically unique label has a different meaning than other labels. If every label in the merged schema is semantically unique, then no two labels are synonymous. Longer labels contribute to semantic uniqueness, but shorter labels may be easier for users to grasp quickly, consume less memory resources or screen space, and so on.

In embodiments, a two-step process is followed to generate BE labels in a merged schema. First, plausible label candidates for each BE are generated and ranked. Second, the set of labels for the merged schema with the best overall ranks is selected. In some example embodiments, the merged schema is a canonical data model (CDM).

In the description that follows, the term $NA_x$ is used to refer to the name of a specific BE, $be_x$. Similarly, the term $DE_x$ is used to refer to the description of $be_x$. The term $d_x$ is used as a placeholder to refer interchangeably to $NA_x$ or $DE_x$.

To identify descriptive labels, every term in the BE names and descriptions is considered. To be agnostic of synonyms, an adapted synonym finder first extracts all possible meanings of each term t by retrieving the sets of synonyms ("synsets") $S_t = \{s_1, s_2, \ldots, s_n\}$ from a source of synonyms. For example, WordNet, as described by WORDNET: AN ELECTRONIC LEXICAL DATABASE, Christiane Fellbaum, Bradford Books (1998), may be used. To increase accuracy, the synsets are retrieved only for the part of speech ("POS") as which t actually appeared. Further, $S_t$ is extended by the synsets of derivationally related forms of t. For example, WordNet can also be used to identify the derivationally related forms of the term. That increases the possibility of overlaps of the synsets of different, related terms, especially when used as different POS. The frequency of the synset s among the synsets of all terms of the names and descriptions $d_x$ of the BE $be_x$, denoted as $f(s, d_x)$, indicates the relevance of s for describing $be_x$. We normalize the frequency over all $be_x$'s synsets $S_{d_x} = \cup_{t \in d_x} S_t$ as in the term frequency (TF) approach by $$tf(s, d_x) = \frac{f(s, d_x)}{\max\{f(s, d_x): s \in S_{d_x}\}}.$$

For the final creation of descriptive labels, a synset s may be expressed by most frequent term t from $d_x$ with $s \in S_t$ to adapt to the common technical terms of the domain.

Often, there are fewer interesting words than BEs, which means that word selection by TF does not produce unique labels, and one or more phrases must be used In the discussion below of a process for generating phrases from the node labels and descriptions of the BEs, the description "The field represents the contract date representing the current schedule delivery" will be used as a running example.

Within the description, nouns, verbs, adjectives, and adverbs are identified as interesting words for use in building phrases. Each interesting term is represented by its most frequent synset, as illustrated in Table 4, below.

TABLE 1

Representation of each term as position in sentence, POS, and most frequent synset.

| Term | field | represents | contract | date | representing | current | scheduled | delivery |
|---|---|---|---|---|---|---|---|---|
| Position | 2 | 3 | 5 | 6 | 7 | 9 | 10 | 11 |
| POS | Noun | Verb | Noun | Noun | Verb | Adj | Adj | Noun |
| Synset | $S_1$ | $S_2$ | $S_3$ | $S_4$ | $S_2$ | $S_5$ | $S_6$ | $S_7$ |

The phrase generator passes a sliding window over the text and considers all synset sequences in the window as possible candidates. For our running example we use a sliding window of size 4. With this window, we both ensure some semantic coherence between the candidates and limit the numbers of possible combinations given the acceptable relative distance among synsets. Here, relative distance means how far the synsets are away from each other depending on the position in the sentence. For example, the token delivery at position 11 and the token current at position 9, are 11−9=2 units away from each other. Furthermore, the shorter the total distance of a phrase is, the higher the probability for the combination of tokens to be a compound, because the phrase is already contained (almost) verbatim in the input.

Within the window, order of the terms is maintained, but intermediate terms may be omitted. For example, with a window size of 3, the first set of terms considered would be "field represents contract." Within that window, the list of phrases considered is: "field", "represents", "contract", "field represents", "field contract", "represents contract", and "field represents contract". In some example embodiments, phrases consisting of a single term are not considered.

To avoid redundancy, the phrase generator can filter out synset sequences that contain duplicate synsets. For example, as can be seen in Table 4, represent and representing have the same synset, $S_2$. For this reason, the phrase $S_2 S_3 S_4 S_2$ would be excluded.

If the last term in a considered phrase is not a noun, the phrase generator modifies that term to be a noun. For example, the phrase "current scheduled" becomes "current schedule."

The quality of each phrase is then determined heuristically. In an example heuristic, a phrase p is ranked based on the average frequency of the words in the phrase:

$$\overline{wf} = \frac{\Sigma_{t \in p} tf(t, d_x)}{le},$$

where le is the length of the phrase p. Additional weight may be given to longer phrases and to phrases made of terms taken from names rather than descriptions. Longer phrases may be more specific, and provide more information to the user. Similarly, each word in a name may have been more carefully chosen by the business than the words in the corresponding description, since a name is generally shorter than a description. In some embodiments, more weight is given to shorter phrases, which may be made of terms that are more nearly adjacent in the name or description.

An example ranking formula is:

$$r(p) = \frac{2le_{na}(p) + le_{de}(p)}{\max(2le_{na} + le_{de})} \times \frac{2\overline{wf}_{na}(p) + \overline{wf}_{de}(p)}{\max(2\overline{wf}_{na} + \overline{wf}_{de})} \times \frac{2\overline{di}_{na}^T(p) + \overline{di}_{de}^T(p)}{\max(2\overline{di}_{na}^T + \overline{di}_{de}^T)} \times \frac{2pf_{na}(p) + pf_{de}(p)}{\max(2pf_{na} + pf_{de})}.$$

This example provides the rank of phrase p in terms of the length, word frequency, distance between words, and phrase frequency of p relative to other phrases. In this formula, the reciprocal of the average distance of words in a phrase, $$\overline{di}^T = \frac{le - 1}{di},$$

is used, where di is the distance between the first and the last word of the phrase in the original text. The frequency of the phrase in the names or descriptions of $be_x$, $pf = tf(p, d_x)$, is also used.

When the phrase is a single word, the ranking formula above cannot be used without modification because di is zero, causing the inverse of $di^T$ to be undefined. To address this, for single-word phrases, the term $$\frac{2\overline{di}_{na}^T + \overline{di}_{de}^T}{\max(2\overline{di}_{na}^T + \overline{di}_{de}^T)}$$

can be treated as 1.

A single generated phrase is assigned to each BE as a label. As an additional constraint, in some embodiments, the labels of each BE are semantically unique. To optimize the assignments, the phrase selector formulates the constraints and variables of a Constraint Satisfaction Problem (CSP). Various CSP solution methods may be used, such as Choco 2.1.3, a general constraint satisfaction framework. In the discussion below, subscripts are used to denote the rank $r_{x,i}$ for each of the n(x) candidate phrases $p_{x,i}$ generated for $be_x$ where i=1, 2, ..., n(x). Each BE $be_x$ is represented by the variables $label_x$: $\{p_{x,1}, p_{x,2}, ..., p_{x,n(x)}\}$,
$synsets_x$: $\{s_{x,1}, s_{x,2}, ..., s_{x,n(x)}\}$, and
$rank_x$: $\{r_{x,1}, r_{x,2}, ..., r_{x,n(x)}\}$, whose domains consist of the candidate phrases, the synset sequences for each phrase, and the rank, respectively.

A set of feasible tuples constraints ensures that label, synsets and rank are assigned consistently for each BE $be_x$:

$label_x = p_{x,i}$ $\leftrightarrow synsets_x = s_{x,i}$ $\leftrightarrow rank_x = r_{x,i}, \forall i \in \{1, 2, ..., n(x)\}$.

Another two sets of all-different constraints ensure uniqueness among the values assigned to the label and respectively to the synsets variables, i.e., $label_x \neq label_y$, $synsets_x \neq synsets_y$, of all different BEs $be_x$ and $be_y$. The first constraint ensures that no two BEs are given identical labels. The second constraint ensures that no two BEs are given synonymous labels.

With these constraints in place, the phrase selector maximizes the objective function $$\sum_x rank_x.$$

Compared to existing solutions for generating labels for BEs, this solution may reduce the number of identical or synonymous labels and may be more likely to provide a descriptive and distinctive label for each BE.

Figure 1:
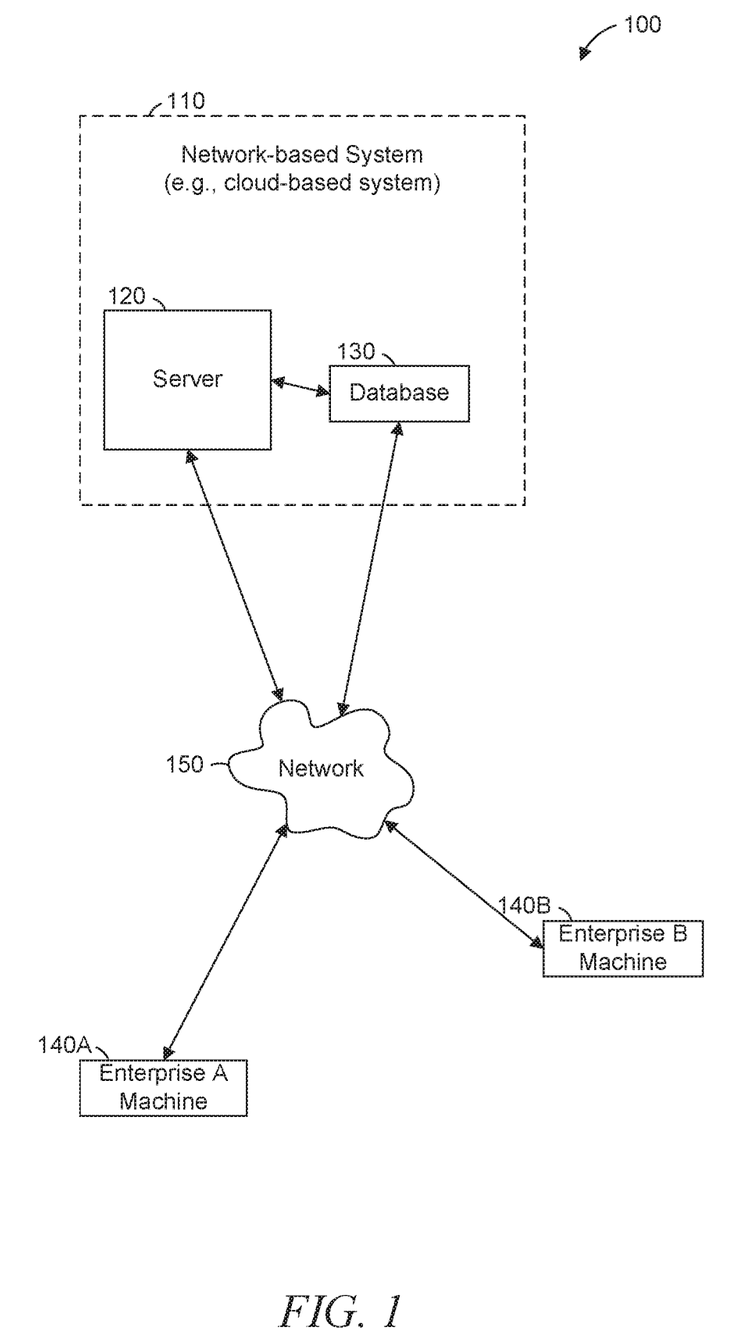
FIG. 1 is a network diagram illustrating a network environment suitable for labeling business entities in a canonical data model, according to some example embodiments.

FIG. 1 is a network diagram illustrating a network environment 100 suitable for labeling business entities in a canonical data model, according to some example embodiments. The network environment 100 includes a server machine 120, a database 130, Enterprise A machine 140A, and Enterprise B machine 140B, all communicatively coupled to each other via a network 150. The Enterprise A machine 140A, associated with a first enterprise, and the Enterprise B machine 140B, associated with a second enterprise, may be referred to collectively as enterprise machines 140. The server machine 120 and the database 130 may collectively comprise a cloud-based system 110 capable of responding to client requests from the enterprise machines 140. The server machine 120 may host an application capable of dispatching tasks to the database 130. The server machine 120 and the enterprise machines 140 may each be implemented in a computer system, in whole or in part, as described below with respect to FIG. 7.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a. "database" is a data storage resource and may store data structured as a text file, a table, a spreadsheet, a relational database (e.g., an object-relational database), a triple store, a hierarchical data store, or any suitable combination thereof. The database may be an in-memory database. The in-memory database may be capable of much higher performance than a disk-based database. Moreover, any two or more of the machines, databases, or devices illustrated in FIG. 1 may be combined into a single machine, and the functions described herein for any single machine, database, or device may be subdivided among multiple machines, databases, or devices.

The network 150 may be any network that enables communication between or among machines, databases, and devices (e.g., the server machine 120 and the Enterprise A machine 140A). Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
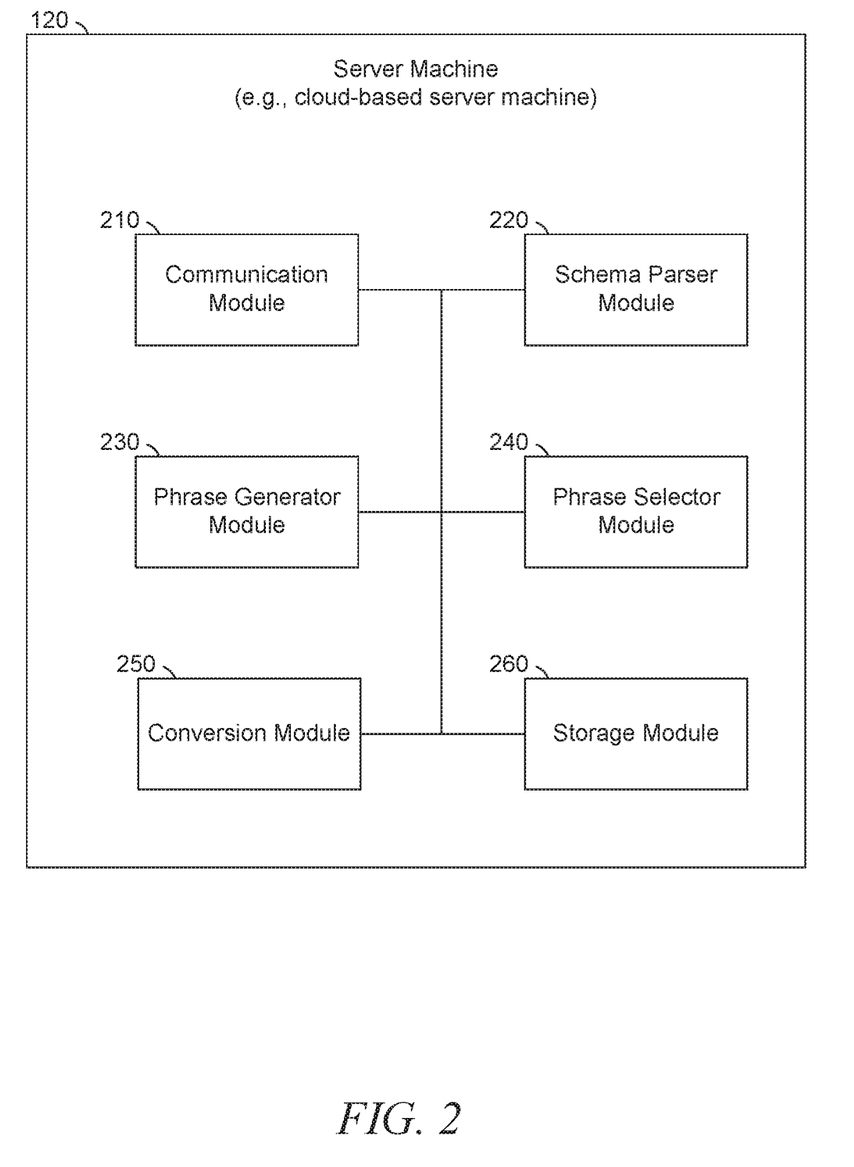
FIG. 2 is a block diagram of a server machine, according to some example embodiments, suitable for labeling business entities in a canonical data model.

FIG. 2 is a block diagram illustrating components of the server machine 120, according to some example embodiments. The server machine 120 is shown as including a communication module 210, a schema parser module 220, a phrase generator module 230, a phrase selector module 240, a conversion module 250, and a storage module 260, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As discussed in more detail below with respect to FIG. 3, the communication module 210 may receive data schemas from two or more enterprises. The schema parser module 220 parses the received schemas to identify the business entities contained therein, along with names and descriptions for the business entities. Candidate phrases for the business entities are generated by the phrase generator module 230. The phrase selector module 240 selects labels for the business entities to use from the candidate phrases generated by the phrase generator module 230. The conversion module 250 accesses data stored in a data schema for an enterprise and converts it to a canonical data model, converts data from a canonical data model to an enterprise-specific schema, or both. The storage module 260 stores the received data schemas, the identified business entities, and the resulting labels. The storage module 260 may also store enterprise data in an enterprise-specific schema, a canonical schema, or both.

Figure 3:
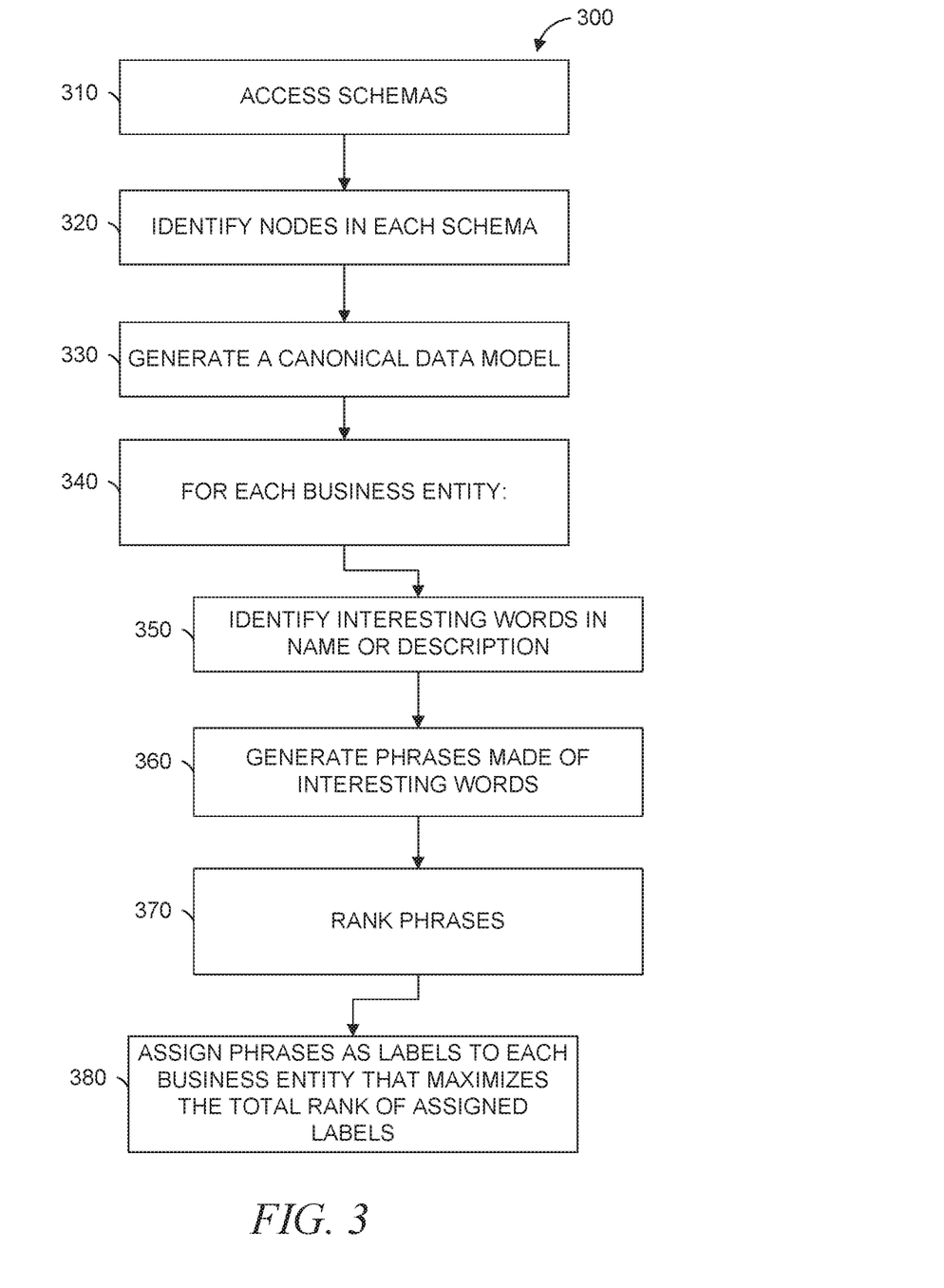
FIG. 3 is a flowchart illustrating operations, according to some example embodiments, of devices performing a process of labeling business entities in a canonical data model.

FIG. 3 is a flowchart illustrating operations of the server machine 120 in performing a process 300 of labeling business entities in a canonical data model, according to some example embodiments. As shown in FIG. 3, the process 300 includes operations 310, 320, 330, 340, 350, 360, 370, and 380. The process 300 is described as being performed by the server machine 120, using modules described above with respect to FIG. 2, by way of example and not limitation.

In operation 310, the communication module 210 receives a set of schemas comprising business entities to be labeled. For example, two enterprises that wish to merge their data may send their schemas to the server machine 120. After the process 300 is complete, the data of each enterprise can be expressed in terms of the CDM generated by the process 300 and thus be compared or processed consistently. As another example, two enterprises wishing to do business may each want to keep their data in their existing schema, but be able to map data received from the other enterprise to that schema. By converting the incoming data from the other enterprise's schema to the CDM, and then converting the data from the CDM to their own schema, an enterprise can import incoming data from another enterprise.

The schema parser module 220 identifies (operation 320) the set of nodes in each schema. Based on the set of nodes, a CDM is created in operation 330. The CDM comprises identified business entities. The phrase generator module 230 begins a loop (operation 340) to process each of the identified business entities. Accordingly, operations 350, 360, and 370 are performed for each identified business entity.

The phrase generator module 230 identifies (operation 350) the interesting words in the names or descriptions of the business entity. Operating on the identified interesting words, the phrase generator module 230 generates, in operation 360, phrases made up of the interesting words. The generated phrases are then ranked, in operation 370.

In operation 380, after phrases have been generated and ranked for all business entities, the phrase selector module 240 assigns labels to each business entity by maximizing the total rank of the assigned labels. In some embodiments, the phrase selector module 240 avoids assigning labels that result in duplicate or synonymous labels for different BEs.

Figure 4:
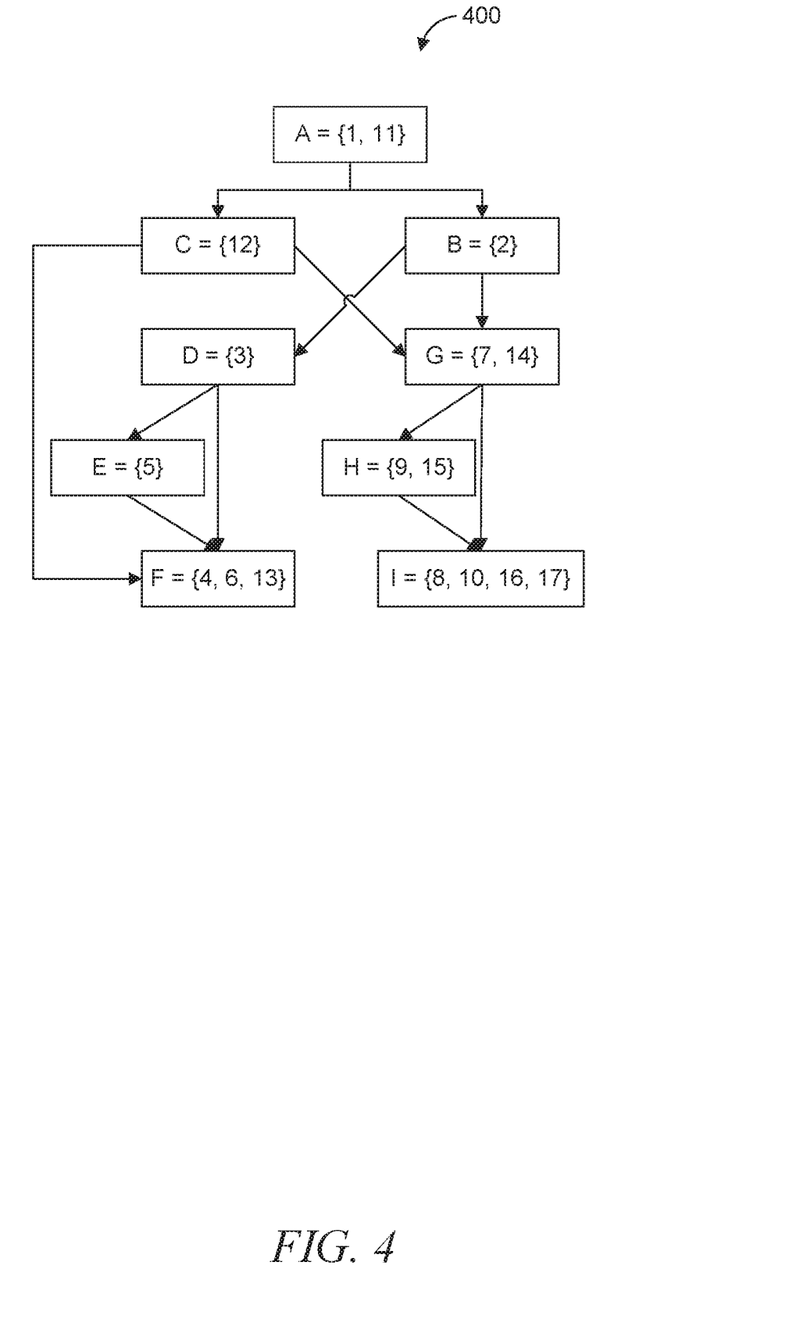
FIG. 4 is a block diagram of an example canonical data model, according to some example embodiments.

FIG. 4 is a block diagram 400 of an example CDM, according to some example embodiments. The example CDM of FIG. 4, with BEs A to I, may be generated from two input schemas, as shown in the tables below. Table 1 shows an example input schema for a first enterprise and Table 2 shows an example input schema for a second enterprise.

TABLE 2

| A First Input Schema | |
|---|---|
| 1 | Order |
| 2 | Contract |
| 3 | Date Time |
| 4 | Date time reference for shipment |
| 5 | Date time qualifier |
| 6 | Scheduled for shipment |
| 7 | Date Time |
| 8 | Date time reference for shipment |
| 9 | Date time qualifier |
| 10 | Current scheduled delivery |

TABLE 3

| A Second Input Schema | |
|---|---|
| 11 | Purchase Order |
| 12 | Header |

TABLE 3-continued

| A Second Input Schema | |
|---|---|
| 13 | Message Text |
| 14 | Date/time/period |
| 15 | Date or time or period function code qualifier |
| 16 | Delivery date/time, estimated |
| 17 | Date or time or period text |

One reliable source for correspondences between the schema nodes are the mappings business experts create when integrating two systems. Analyzing the mappings leads to the insight that, for example, the delivery date is expressed in schema 1 by the value of the "Date time reference for shipment" (node 8) in the "Date time" structure, together with the "Current scheduled delivery" qualifier (node 10). This corresponds to the combination of the "Date or time or period text" field (node 17) residing in the "Date/time/period" structure, together with the "Delivery date/time, estimated" qualifier (node 16), in schema 2. Thus, the nodes 8 and 10 as well as 16 and 17 are joined in the BE I because they express the same concept, namely the delivery date.

Each BE in FIG. 4 just contains a symbolic name such as F or I after the merge. In some embodiments, the problem of finding short, descriptive and unique natural-language labels for each of the BEs is addressed. The input data to this process are the names and descriptions provided for each of the original nodes, as shown in Table 3. Examples of short, descriptive, and unique natural-language labels include Shipment Date and Delivery Date.

TABLE 4

Example BEs and nodes.

| BE | Node | Name of node | Description |
|---|---|---|---|
| F | 4 | Date time reference for shipment | To specify pertinent dates and times |
| F | 6 | Scheduled for shipment | |
| F | 13 | Message Text | To provide a free-form format that allows the transmission of text information |
| I | 8 | Date time reference for shipment | To specify pertinent dates and times |
| I | 10 | Current scheduled delivery | |
| I | 16 | Delivery date/time, estimated | Date and/or time when the shipper of the goods expects delivery will take place |
| I | 17 | Date or time or period text | To specify date, and/or time, or period |

The labeling task is complicated by the limited vocabulary of the description data, since controlled terms from a strictly defined domain are used. For example, both BE description sets in Table 3 contain the words "date," "shipment" or "scheduled." When there are fewer distinct content words than BEs, one or more labels must be phrases. In embodiments, a preference for short labels is balanced with a preference for specificity and discrimination amongst semantically similar BEs.

Reusing the same node defined by some schema template in different contexts is very common in B2B integration. For example, the date and time structures of nodes 4 and 8 in Table 3 are based on the same "Date time" structure from the template but can be interpreted either as a shipment or a delivery date, depending on whether they appear in conjunction with the qualifier node 6 (in BE F) or 10 (in BE I). This means that words and concepts introduced by different usage contexts of nodes are commonly used in BE descriptions.

The free text nodes, e.g., node 13 in BE F, can contain important information which the communicating parties want to exchange, for example, the quality or usage profile of the shipped product. Hence, these nodes might contain interesting terms for labeling the BEs. However, it is also a very common practice to misuse a free text node like node 13 in BE F to store the shipment date. Both factors result in noise in the form of misleading words in the accumulated descriptions of a BE like "text" in BE F.

According to various example embodiments, one or more of the methodologies described herein may facilitate labeling business entities in a canonical data model. Use of a CDM may reduce the number of mappings needed between schemas. For example, each schema can be converted to and from a CDM, using one converter for each schema. By contrast, without a CDM, each schema must be converted to each other schema, resulting in n(n−1)/2 converters used for n schemas. One or more of the methodologies described herein may reduce the amount of manual intervention needed in creating useful labels in a CDM. Reducing the manual intervention may reduce the total amount of time or computer usage required to complete the task of labeling and increase the quality of the labels of the business entities in a canonical data model.

When these effects are considered in aggregate, one or more of the methodologies described herein may obviate a need for certain efforts or resources that otherwise would be involved in labeling business entities in a canonical data model. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 5:
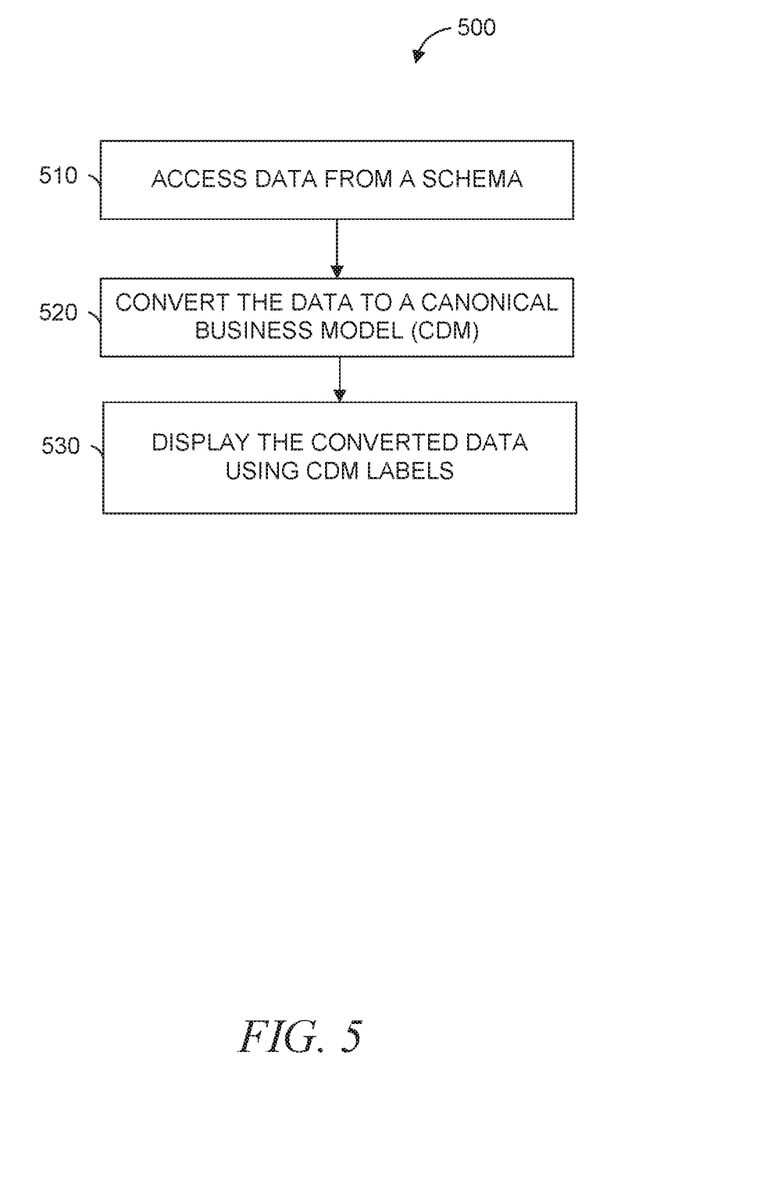
FIG. 5 is a flowchart illustrating operations, according to some example embodiments, of devices performing a process of labeling business entities in a canonical data model.

FIG. 5 is a flowchart illustrating operations, according to some example embodiments, of devices performing a process 500 of labeling business entities in a canonical data model. As shown in FIG. 5, the process 500 includes operations 510, 520, and 530. The process 500 is described as being performed by the server machine 120, using modules described above with respect to FIG. 2, by way of example and not limitation.

In operation 510, the conversion module 250 accesses data from an enterprise schema. For example, the server machine 120 may provide network storage and conversion services to the Enterprise A Machine 140A of a first enterprise and the Enterprise B Machine 140B of a second enterprise. Data, may be uploaded from the Enterprise A Machine 140A using a data schema that is proprietary to the first enterprise. A screen diagram 610 of FIG. 6, described below, shows an example record displayed in the database schema of Enterprise A.

The conversion module 250 converts the accessed data from the enterprise schema to a CDM (operation 520). For example, the enterprise schemas used by the first and second enterprises may have been used to generate a CDM by the process 300, described above. As shown by way of example in FIG. 4, the generation of a CDM includes a mapping from BEs in the CDM to BEs in each enterprise schema and vice versa. The converted data may be stored for later access in the database 130 by the storage module 260.

The converted data may be accessed by the Enterprise A Machine 140A, the Enterprise B Machine 140B, or another machine on the network 150. For example, a third user may not supply or modify data but have read-only access to the data uploaded by the two enterprises. In operation 530, the converted data is caused to be displayed using the labels for the CDM. For example, labels may have been assigned in operation 380 of process 300, described above. The communication module 210 may send the data and the labels to the Enterprise A Machine 140A, the Enterprise B Machine 140B, or both. Screen diagram 620 of FIG. 6, described below, shows an example record displayed using the CDM and the labels for the CDM.

Figure 6:
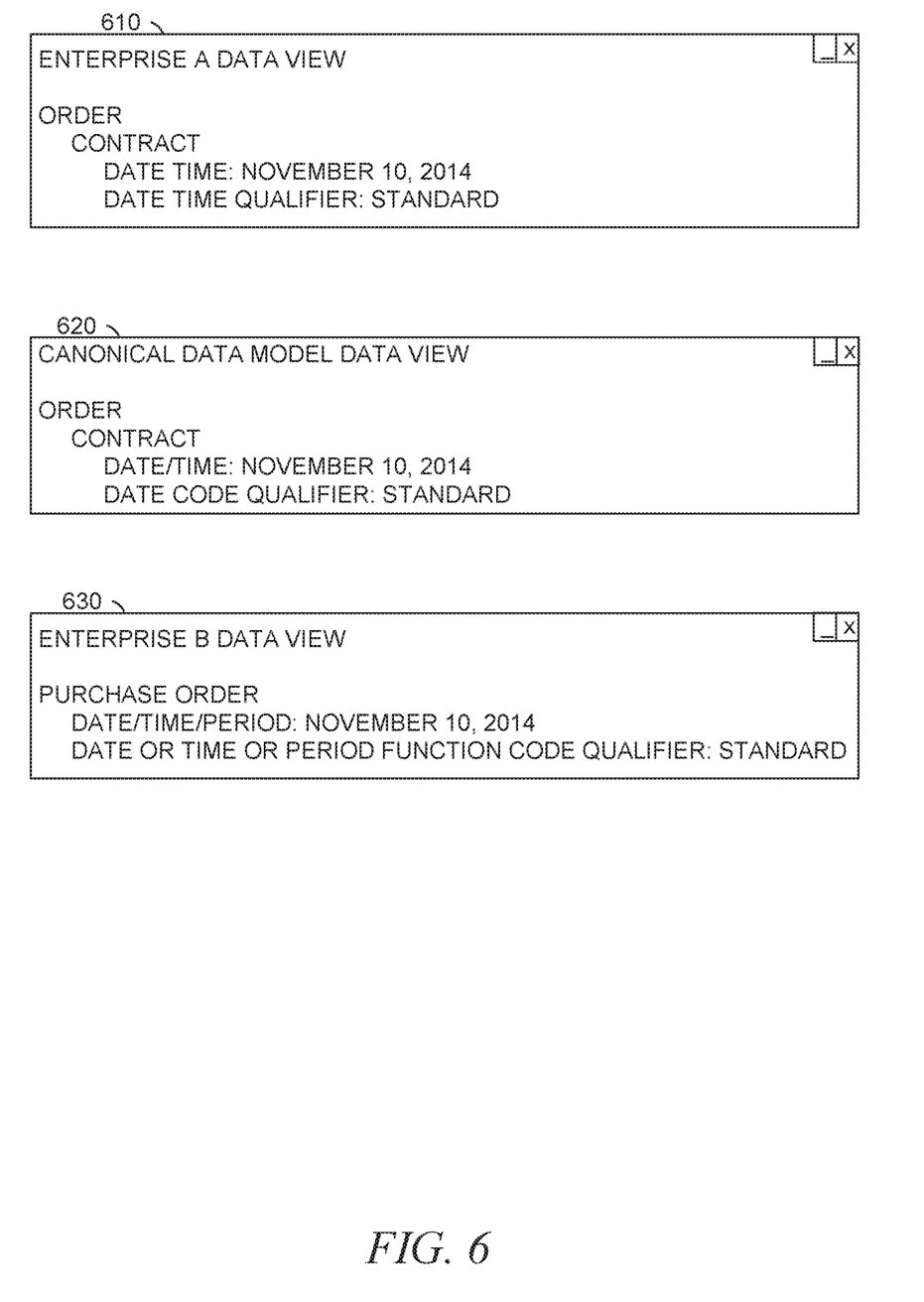
FIG. 6 is a set of screen diagrams, according to some example embodiments, for displaying data in various schemas and a canonical data model.

FIG. 6 is a set of screen diagrams 610-630, according to some example embodiments, for displaying data in various schemas and a canonical data model. Screen diagram 610 shows a data view of an example record in a schema used by Enterprise A. The record includes values in BEs labeled "ORDER," "CONTRACT," "DATE TIME," and "DATE TIME QUALIFIER." The labels are drawn from Table 1, discussed above with reference to FIG. 4. The "ORDER" and "CONTRACT" BEs are containers, while the "DATE TIME" and "DATE TIME QUALIFIER" BEs are fields. In some example embodiments, XML is used to represent the BEs using the schema. For example, the example XML code below may be used to represent the BEs shown in the diagram 610.

```
<order>
    <contract>
        <date_time>november 10, 2014</date_time>
        <date_time_qualifier>standard</date_time_qualifier>
    </contract>
</order>
```

Screen diagram 620 shows the same data labeled according to a CDM. In this case, the labels used for the first two BEs are the same, but the last two BEs are labeled as "DATE/TIME" and "DATE CODE QUALIFIER." The different labels used by the CDM may have been generated using the process 300, discussed above with reference to FIG. 3.

Screen diagram 630 shows the same data labeled according to a schema used by Enterprise B. The labels are drawn from Table 2, discussed above with reference to FIG. 4. The data are mapped from the schema of Enterprise A to the schema of Enterprise B using the CDM of FIG. 4. In this case, since Enterprise B does not have a BE that corresponds to the "CONTRACT" BE of Enterprise A, that BE is not shown in the screen diagram 630.

Figure 7:
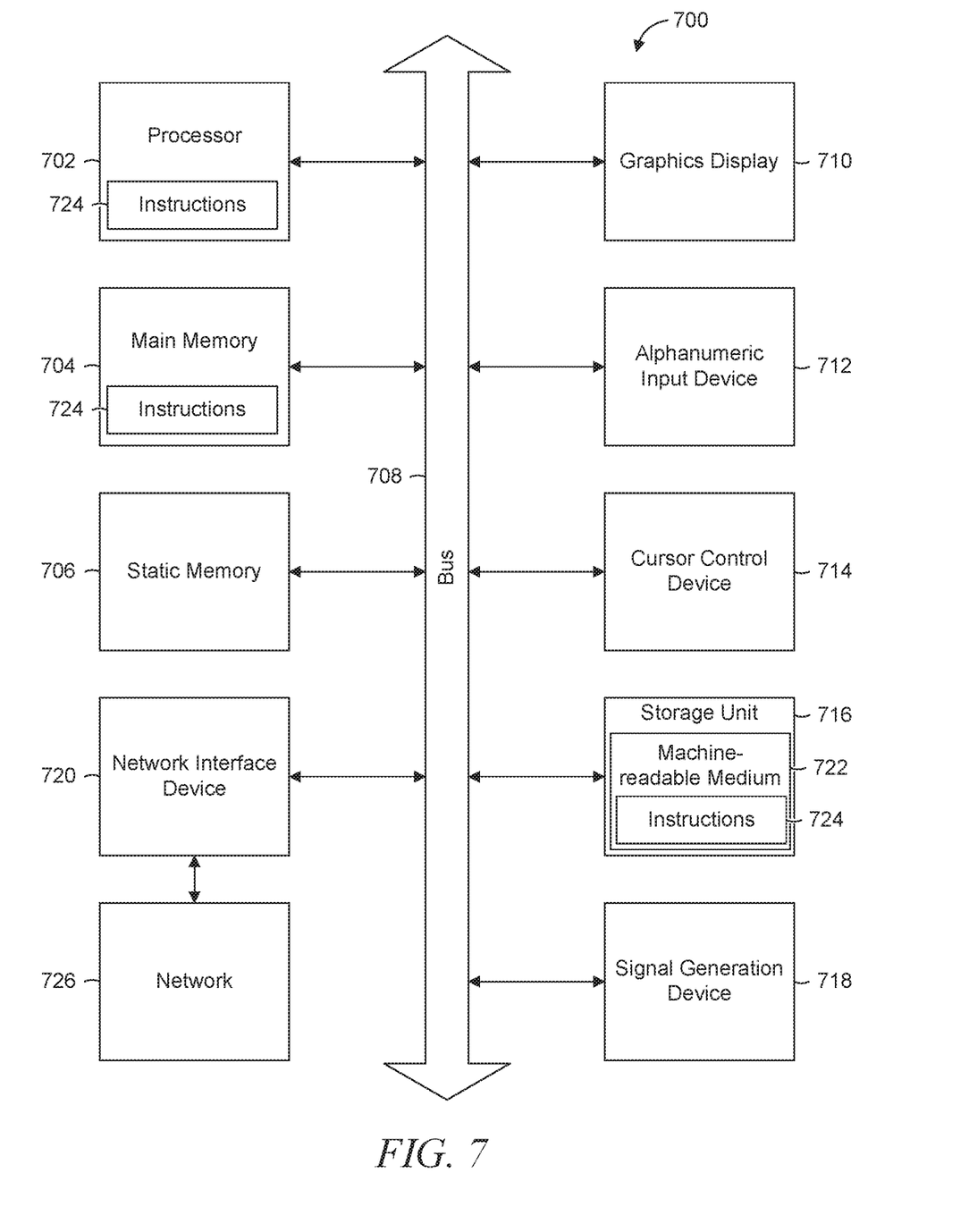
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 150) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising
accessing a first schema comprising a first plurality of business entities including a first business entity, the first business entity having a first label in the first schema;
accessing a second schema comprising a second plurality of business entities including the first business entity, the first business entity having a second label in the second schema;
generating, by one or more processors, from the first schema and the second schema, a merged schema comprising a third plurality of business entities, including a single instance of the first business entity;
storing, by the one or more processors, the merged schema in a database;
selecting, by the one or more processors, a phrase from the first name of the first business entity;
determining, by the one or more processors, that the phrase is not a noun phrase;
based on the determination, generating, by the one or more processors, a noun phrase from the phrase;
assigning, by the one or more processors, the noun phrase as a label for the first business entity in the merged schema;
receiving data stored using the first schema;
converting the received data to the merged schema; and
causing presentation of the converted data using the assigned label.

2. The method of claim 1, wherein the selecting of the phrase from the first label of the first business entity comprises identifying nouns, verbs, adjectives, and adverbs from the first label of the first business entity as words for use in building phrases.

3. The method of claim 2, wherein each of the identified words is represented by a corresponding synonym set (synset).

4. The method of claim 3, wherein the selecting of the phrase from the first label of the first business entity comprises generating a plurality of synset sequences from the synsets corresponding to the identified words.

5. The method of claim 4, wherein the selecting of the phrase from the first label of the first business entity comprises removing, from the plurality of synset sequences, synset sequences that contain duplicate synsets.

6. The method of claim 1, wherein the determining that the phrase is not a noun phrase comprises determining that a last word of the phrase is not a noun.

7. The method of claim 1, wherein the first label of the first business entity comprises a first name of the first business entity.

8. The method of claim 1, wherein the first label of the first business entity comprises a first description of the first business entity.

9. A system comprising:
a memory that stores instructions; and
one or more processors configured by the instructions to perform operations comprising:
accessing a first schema comprising a first plurality of business entities including a first business entity, the first business entity having a first label in the first schema;
accessing a second schema comprising a second plurality of business entities including the first business entity, the first business entity having a second label in the second schema;
generating from the first schema and the second schema, a merged schema comprising a third plurality of business entities, including a single instance of the first business entity;
storing the merged schema in a database;
selecting a phrase from the first label of the first business entity;
determining that the phrase is not a noun phrase;
based on the determination, generating a noun phrase from the phrase;
assigning the noun phrase as a label for the first business entity in the merged schema;
receiving data stored using the first schema;
converting the received data to the merged schema; and
causing presentation of the converted data using the assigned label.

10. The system of claim 9, wherein the selecting of the phrase from the first label of the first business entity comprises identifying nouns, verbs, adjectives, and adverbs from the first label of the first business entity as words for use in building phrases.

11. The system of claim 10, wherein each of the identified words is represented by a corresponding synonym set (synset).

12. The system of claim 11, wherein the selecting of the phrase from the first label of the first business entity comprises generating a plurality of synset sequences from the synsets corresponding to the identified words.

13. The system of claim 12, wherein the selecting of the phrase from the first label of the first business entity comprises removing, from the plurality of synset sequences, synset sequences that contain duplicate synsets.

14. The system of claim 9, wherein the determining that the phrase is not a noun phrase comprises determining that a last word of the phrase is not a noun.

15. The system of claim 9, wherein the first label of the first business entity comprises a first name of the first business entity.

16. The system of claim 9, wherein the first label of the first business entity comprises a first description of the first business entity.

17. A non-transitory machine-readable medium that stores instructions which, when executed by one or more processors of a machine, cause the machine to perform operations comprising:
accessing a first schema comprising a first plurality of business entities including a first business entity, the first business entity having a first label in the first schema;
accessing a second schema comprising a second plurality of business entities including the first business entity, the first business entity having a second label in the second schema;
generating from the first schema and the second schema, a merged schema comprising a third plurality of business entities, including a single instance of the first business entity;
storing the merged schema in a database;
selecting a phrase from the first label of the first business entity;
determining that the phrase is not a noun phrase;
based on the determination, generating a noun phrase from the phrase;
assigning the noun phrase as a label for the first business entity in the merged schema;
receiving data stored using the first schema;
converting the received data to the merged schema; and
causing presentation of the converted data using the assigned label.

18. The non-transitory machine-readable medium of claim 17, wherein the selecting of the phrase from the first label of the first business entity comprises identifying nouns, verbs, adjectives, and adverbs from the first label of the first business entity as words for use in building phrases.

19. The non-transitory machine-readable medium of claim 18, wherein each of the identified words is represented by a corresponding synonym set (synset).

20. The non-transitory machine-readable medium of claim 18, wherein the selecting of the phrase from the first label of the first business entity comprises generating a plurality of synset sequences from the synsets corresponding to the identified words.

* * * * *